(12) United States Patent
Takahashi

(10) Patent No.: US 8,868,270 B2
(45) Date of Patent: Oct. 21, 2014

(54) ADJUSTABLE REGENERATIVE LIMIT AND WARNING SYSTEM

(75) Inventor: Shigenori Takahashi, Anjo (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 150 days.

(21) Appl. No.: 13/551,303

(22) Filed: Jul. 17, 2012

(65) Prior Publication Data

US 2013/0274971 A1    Oct. 17, 2013

Related U.S. Application Data

(60) Provisional application No. 61/624,178, filed on Apr. 13, 2012.

(51) Int. Cl.
*G06F 17/00* (2006.01)
*H02P 3/14* (2006.01)

(52) U.S. Cl.
USPC ............................................. 701/22; 318/376

(58) Field of Classification Search
CPC ....... H02J 7/1438; H02J 7/00; F02N 11/0866; B60W 2720/26
USPC .............................. 701/22; 320/107; 318/376
See application file for complete search history.

(56) References Cited

U.S. PATENT DOCUMENTS

| | | | |
|---|---|---|---|
| 4,671,577 A | 6/1987 | Woods | |
| 5,024,489 A | 6/1991 | Tanaka et al. | |
| 6,021,365 A | 2/2000 | Ishii et al. | |
| 6,203,468 B1 | 3/2001 | Nitta et al. | |
| 6,321,144 B1 | 11/2001 | Crombez | |
| 6,508,523 B2 | 1/2003 | Yoshino et al. | |
| 6,719,379 B2 | 4/2004 | Crombez | |
| 7,190,260 B2 | 3/2007 | Rast | |
| 7,311,163 B2 | 12/2007 | Oliver | |
| 7,617,894 B2 | 11/2009 | Ozeki et al. | |
| 7,898,405 B2 | 3/2011 | Burke et al. | |
| 2004/0210356 A1* | 10/2004 | Wilton et al. | 701/22 |
| 2005/0099146 A1* | 5/2005 | Nishikawa et al. | 318/63 |
| 2009/0125286 A1 | 5/2009 | Waltz | |
| 2010/0097202 A1 | 4/2010 | Wantanabe et al. | |
| 2011/0082632 A1 | 4/2011 | Rowker et al. | |
| 2011/0264317 A1* | 10/2011 | Druenert et al. | 701/22 |
| 2013/0175976 A1* | 7/2013 | Rana | 320/107 |

* cited by examiner

*Primary Examiner* — Helal A Algahaim
*Assistant Examiner* — Nga X Nguyen
(74) *Attorney, Agent, or Firm* — Snell & Wilmer LLP

(57) ABSTRACT

An adjustable regenerative limit and warning system and method for controlling regenerative energy of a vehicle. The system includes a battery, a motor, a processor and an indicator. The motor provides regenerative energy to the battery during deceleration of the vehicle. The processor determines instantaneous or calculated traction loss of the vehicle and controls or limits the regenerative energy provided to the battery to avoid or reduce such traction loss. A drive mode having a predetermined regenerative energy capability is selected by the processor for limiting the regenerative energy. Sensors coupled with the battery sense characteristics of the battery for provision to the processor for determining a charge capability of the battery. If the charge capability for the battery is lower than the regenerative energy capable by the drive mode, the regenerative energy may be further limited and a warning or notification transmitted to a user of the vehicle.

20 Claims, 8 Drawing Sheets

ADJUSTABLE REGENERATIVE LIMIT AND WARNING SYSTEM

CROSS REFERENCE TO RELATED APPLICATIONS

This application claims the benefit and priority of U.S. Provisional Application No. 61/624,178, entitled Adjustable Regenerative Limit and Warning System, filed on Apr. 13, 2012, the entire contents of which are hereby incorporated by reference.

BACKGROUND

1. Field

The present invention relates generally to vehicle charge and notification systems and improvements thereof. More particularly, the present invention relates to adjustable regenerative charge and notification systems and methods for limiting regenerative energy of an automobile or other vehicle based upon vehicle or environmental characteristics and improvements thereof.

2. Description of the Related Art

Electric and hybrid automobiles and other vehicles have become increasingly popular as prices for gasoline have continued to increase. However, batteries or other electric power storage devices of such vehicles typically offer only a limited driving range based on their capability to store electric charge. In an effort to extend the driving range, many charging systems in conventional electric or hybrid vehicles now utilize an energy recapture system wherein regenerative energy is provided to the battery from a motor during periods of deceleration. By operating the motor in a reverse or opposite direction during slowing of the vehicle, energy may be generated by the motor and transmitted to the battery for recharging the battery. The greater the operation of the motor in the reverse direction, the greater the amount of regenerative energy can be provided to the battery for charging purposes. Thus, electric or hybrid vehicles may recapture and store energy in the battery during periods of deceleration instead of merely dissipating braking energy as heat due to friction.

However, while greater amounts of regenerative energy can result in quicker charging of the battery, the greater operation of the motor in the reverse direction also results in a greater reduction in speed for the vehicle. These high deceleration rates during energy regeneration can be problematic when conditions of or surroundings of the vehicle would compromise the drivability or performance of the vehicle. While short stopping distance can be useful under certain driving conditions (e.g., dry, flat, paved roadways), abrupt stops for a vehicle in less ideal conditions (e.g., rainy, icy or snowy weather on loose gravel roadways) may not be desired. Indeed, the vehicle may be placed into a skid condition in such circumstances. Various methods have been attempted for addressing traction loss in automobiles, including combinations of friction brakes or other brake assemblies with regenerative energy systems and use of displays indicating current levels of regenerative braking, but such methods have failed to adequately address the issues above. Thus, a system or method that can adjustably limit regenerative energy based on or in response to such less ideal conditions and warn a user of such limits would be desirable.

Ideally, a regenerative limit and warning system or method for limiting regenerative energy of a vehicle would be capable of controlling energy characteristics of the vehicle based on traction information or data for the vehicle. A regenerative limit and warning system or method would ideally allow for one or more limits or reductions in regenerative energy provided to a battery of the vehicle in response to either instantaneous traction loss or expected or calculated traction loss for predetermined deceleration rates. Moreover, a regenerative limit and warning system or method would ideally allow for regenerative energy limitations based upon characteristics of the battery of the vehicle and be capable of alerting a user of such limitations. A regenerative energy limiting and warning system or method would also ideally be relatively inexpensive to manufacture and integrate with other systems or components of the vehicle.

SUMMARY

A system or method for limiting regenerative energy of a vehicle based upon a vehicle or environmental characteristic is described. In one embodiment, a charging system for a vehicle may include a battery, a motor coupled with the battery and configured to provide energy to the battery for charging the battery during slowing of the vehicle, a first sensor for sensing wheel slip of the vehicle, and a processor coupled with the sensor and the motor, the processor configured to limit the energy provided by the motor to the battery based upon the wheel slip sensed by the sensor.

In another embodiment, a charging system for a vehicle may include a rechargeable battery, a motor connected to the rechargeable battery and configured to provide energy to the rechargeable battery for charging the rechargeable battery when the vehicle reduces speed, a processor connected to the motor and configured to limit the energy provided by the motor to the rechargeable battery by selecting a drive mode for the vehicle, the processor configured to further limit the energy provided by the motor to the rechargeable battery based on a charge capability of the rechargeable battery, and a display connected to the processor and configured to illuminate in response to a signal from the processor when the energy provided by the motor to the rechargeable battery is further limited based on the charge capability of the rechargeable battery.

In still another embodiment, a method for limiting energy of a vehicle for charging the vehicle may include the steps of providing a battery and a motor coupled with the battery, the motor configured to transmit energy to the battery during slowing of the vehicle, providing a processor coupled with the motor, determining, using the processor, a traction loss of the vehicle, and limiting the energy transmitted to the battery from the motor when the traction loss of the vehicle is greater than a predetermined amount.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
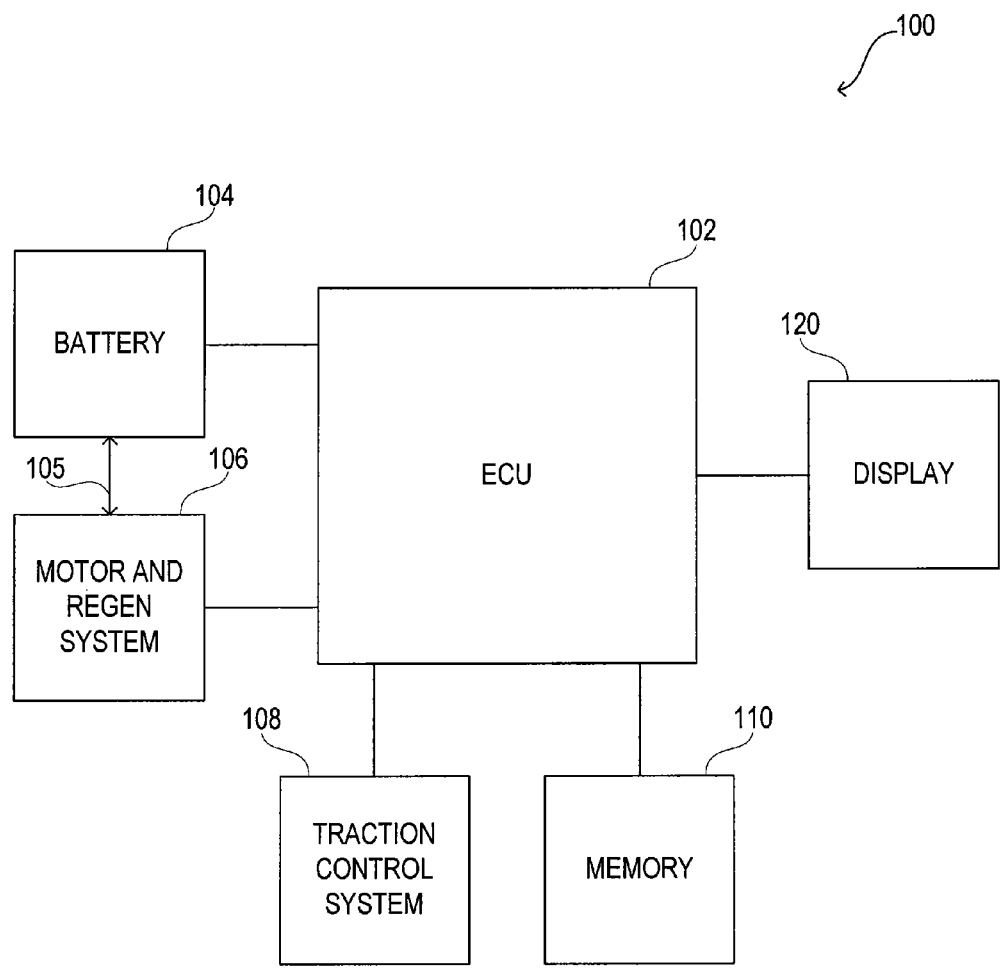
FIG. 1 is a block diagram of an adjustable regenerative limit and warning system for a vehicle according to an embodiment of the present invention.

Referring to FIG. 1, a block diagram shows various components or systems of an adjustable regenerative limit and warning system 100 for a vehicle. The adjustable regenerative limit and warning system 100 includes an ECU 102 or other processor electrically connected with a display 120 (e.g., a light emitting diode or other lamp or light). Based upon various inputs provided to the ECU 102 and/or calculations or algorithms performed therewith, the ECU 102 may output a signal to the display 120 for alerting or warning a user of the vehicle when a reduced amount of regenerative energy is being captured, as discussed in greater detail herein.

A battery 104 is connected to the ECU 102 and is used, inter alia, to provide power to the vehicle for moving the vehicle. A motor and regen system 106 is also connected to the ECU 102 and includes a number of components or equipment (e.g., a motor, conductive power lines, gearing, etc.) for providing power to wheels or a drivetrain of the vehicle and additionally for recharging the battery 104. The motor and regen system 106 interfaces 105 with the battery 104 to receive energy from the battery 104, for example, to increase a speed of the vehicle. The motor and regen system 106 also interfaces 105 with the battery 104 to provide energy to the battery 104, for example, during decreasing speed of the vehicle to charge the battery 104. The greater the energy provided to the battery 104 from the motor and regen system 106, the greater the rate or amount of deceleration for the vehicle.

Accordingly, the adjustable regenerative limit and warning system 100 provides for reduced or limited energy regeneration provided from the motor and regen system 106 to the battery 104 in response to detected braking or slowing conditions. For example, if the vehicle is operating on a slippery roadway where less abrupt slowing would be desirable to avoid traction loss, the adjustable regenerative limit and warning system 100 automatically limits the amount of energy generated or provided by the motor and regen system 106 to the battery 104 in order to lessen the deceleration of the vehicle during such recharging. This operation may be accommodated by switching between predefined drive modes for the vehicle, each drive mode having a predefined or predetermined level of energy regeneration. The energy may also be further limited or adjusted based on other vehicle characteristics, for example, charge capability of the battery 104.

In one example, the vehicle may operate in a first driving mode (e.g., a B-mode or brake mode) having a first level or amount of energy generated during nominal driving conditions and switch to a second driving mode (e.g., a low mu B-mode) having a second level or amount of energy generated that is lower than the first level or amount upon detection of compromised driving conditions. The ECU 102 may send a signal or otherwise communicates with the display 120 to warn or alert a user of the vehicle when energy regeneration reductions or limits are in effect. Such a signal may be triggered, as discussed in greater detail herein, in order to avoid nuisance alerts being displayed to the user of the vehicle.

The ECU 102 is also connected to and interfaces with one or more components of a traction control system 108 and a memory 110 of the vehicle for determining whether to reduce energy regeneration for the battery 104. The memory 110 may store various thresholds, algorithms, or logical steps for reducing or limiting the regenerative energy provided to the battery 104 and/or illuminating the warning light, message or indication on the display 120. The traction control system 108 may include a variety of components (e.g., a sensor or other device) for determining optimal or desired operation of or control over power provided to one or more wheels of the vehicle. For example, if one of the wheels of the vehicle is sensed or otherwise determined to be slipping during movement of the vehicle (e.g., is exhibiting a loss of traction with a roadway), the traction control system 108 may reduce power sent to such wheel and instead route it to one or more of the remaining wheels that currently exhibit better traction or grip.

The ECU 102 may utilize the information, data, or determinations of the traction control system 108 for controlling energy regeneration for charging the battery 104. For example, if the traction control system 108 senses or determines that one or more wheels of the vehicle has reduced traction (e.g., due to weather, vehicular conditions or road conditions), the ECU 102 may lower or limit the energy provided to the battery 104 from the motor and regen system 106. Thus, the vehicle may not slow or stop as quickly and the adjustable regenerative limit and warning system 100 can provide a more controlled or slower stop in less than ideal driving conditions.

In an alternative embodiment, the ECU 102 may interface with independent sensors or other equipment in addition to, or in replacement of, the traction control system 108. For example, one or more independent sensors for determining wheel slip may be directly connected with the ECU 102. In another example, the ECU 102 may interface with electronic devices configured to determine weather conditions surrounding the vehicle, such as a sensor coupled with a windshield or other exterior surface of the vehicle and configured to detect wetness or moisture on such surface indicative of rain or other slippery conditions. In yet another example, the ECU 102 may interface with electronic devices configured to determine vehicle position upon particular road surfaces (e.g., a GPS system) for identifying when the vehicle is driving over a dirt or gravel roadway. In still another example, the ECU 102 may interface with user-controlled elements, such as windshield wipers, 4WD or AWD controls, etc., and limit regenerative energy produced or sent from the motor and regen system 106 to the battery 104 based upon such manual controls.

The adjustable regenerative limit and warning system 100 may also operate with an adjustable or variable trigger, limit or threshold (e.g., stored in the memory 110 and dependent on the drive mode the vehicle is currently operating under) for reducing nuisance alerts to the user of the vehicle. For example, when the vehicle is operating in a first driving mode (e.g., a D-mode or drive mode), regenerative energy may be captured in the battery 104 at a first rate or amount (e.g., 5 kW). When the vehicle is operating in a second driving mode (e.g., B-mode), regenerative energy may be captured in the battery 104 at a second rate or amount higher than the first amount (e.g., 10 kW). If the currently available energy for recapture due to slowing of the vehicle (e.g., when a driver removes their foot from an accelerator pedal) is lower than the rate or amount allowed in the particular driving mode, a warning light may illuminate on the display 120. Thus, for example, if only 9 kW of regenerative energy is available or produced by the motor and the vehicle is operating in the B-mode with the 10 kW energy regeneration capacity, the warning light will be illuminated by the ECU 102. In contrast, if the vehicle were operating in D-mode with the 5 kW energy regeneration capacity, the warning light would not be illuminated by the ECU 102.

In another example, if 9 kW of regenerative energy is available or produced by the motor and the vehicle is operating in the B-mode with the 10 kW energy regeneration capacity, the warning light will be illuminated by the ECU 102. However, if the vehicle is operating in a low mu B-mode (e.g., having 8 kW energy regeneration capacity) then the warning light will not be illuminated by the ECU 102. Thus, the warning light may be triggered according to different drive modes for the vehicle. Regenerative energy limits or amounts may also be further adjusted in addition to selection of a drive mode, as discussed in greater detail herein. Such adjustment may be accomplished automatically via calculation by the ECU 102 of an algorithm stored in the memory 110 with an input variable corresponding to a current drive mode of the vehicle. Additional or replacement input variables may be utilized in an alternative embodiment, for example, gear position, temperature of the battery 104, state of charge of the battery 104, etc.

Figure 2:
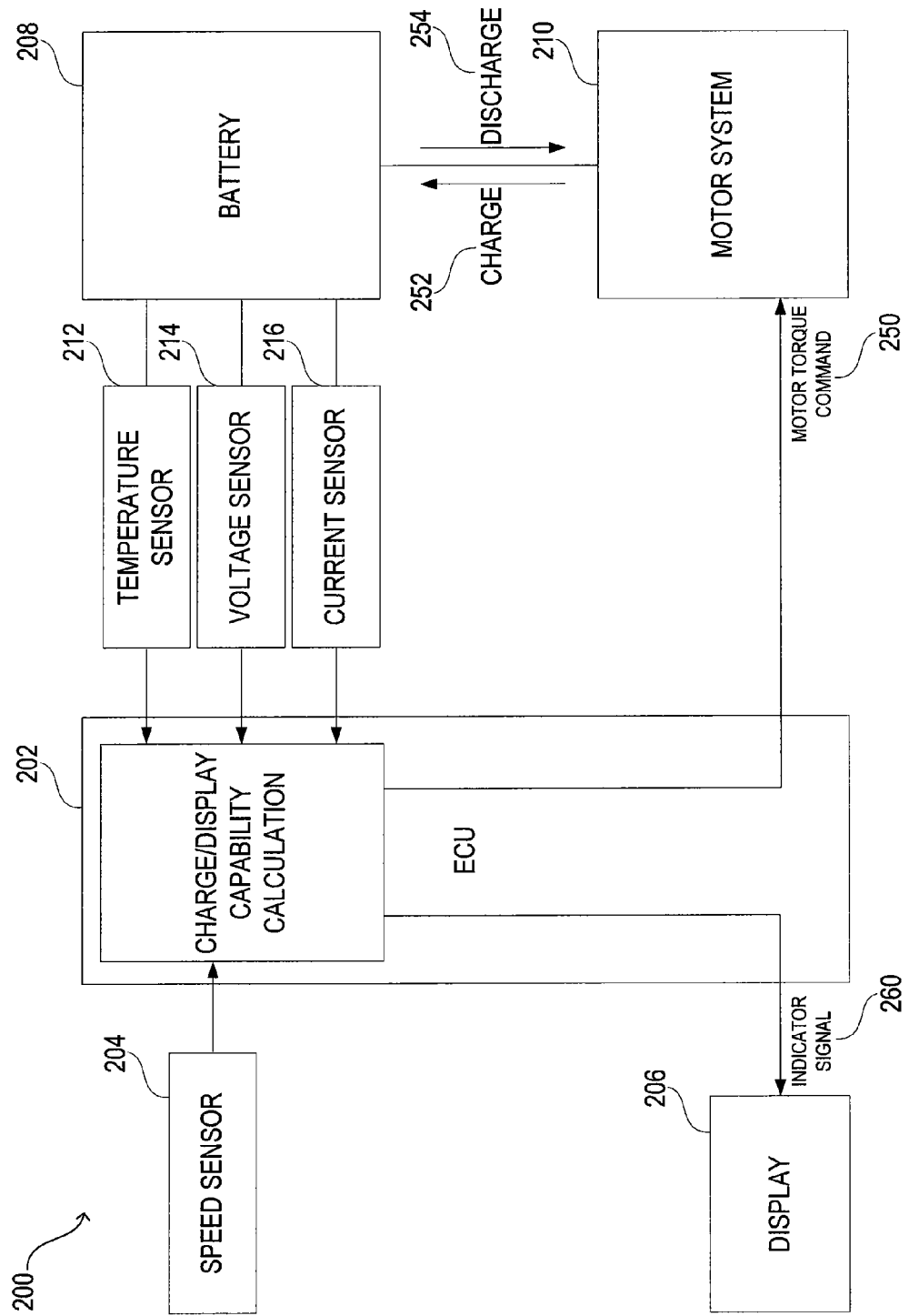
FIG. 2 is a block diagram of an adjustable regenerative limit and warning system for a vehicle according to an embodiment of the present invention.

FIG. 2 shows a block diagram of an alternative regenerative limit and warning system 200 of a vehicle. The regenerative limit and warning system 200 may have certain structural or functional features that are the same as or similar to those previously described for FIG. 1. The regenerative limit and warning system 200 includes an ECU 202 or other processor with charge and/or display capability calculation functionality, the same as or similar to the previous discussion for FIG. 1. The ECU 202 is connected with a speed sensor 204 for detecting an instantaneous speed of the vehicle. A battery 208 is configured to interface (i.e., charge 252 or discharge 254) with a motor system 210, the same as or similar to the previous discussion for FIG. 1. The motor system 210 is also connected with the ECU 202 and is configured to receive and respond to a motor torque command 250 or signal from the ECU 202 for controlling energy consumption or production by the motor system 210.

A temperature sensor 212, a voltage sensor 214 and a current sensor 216 are coupled with the battery 208 for sensing a temperature, a voltage level, and a current level, respectively, of the battery 208 for calculating or otherwise determining a charge capability of the battery 208. Each of the temperature sensor 212, the voltage sensor 214 and the current sensor connect with the ECU 202 for sending their respective signals to the ECU 202. In an alternative embodiment, additional or fewer sensors or other charge capability detection devices may be utilized. The ECU 202 is also connected with a display 206 and is configured to send an indicator signal 260 or command to the display 206 for alerting a user of the vehicle when energy regeneration is reduced or limited, the same as or similar to the previous discussion for FIG. 1. The display 206 may be a light emitting diode, a lamp or other illuminating light source, or any portion of a larger screen capable of displaying information to a user.

Figure 3:
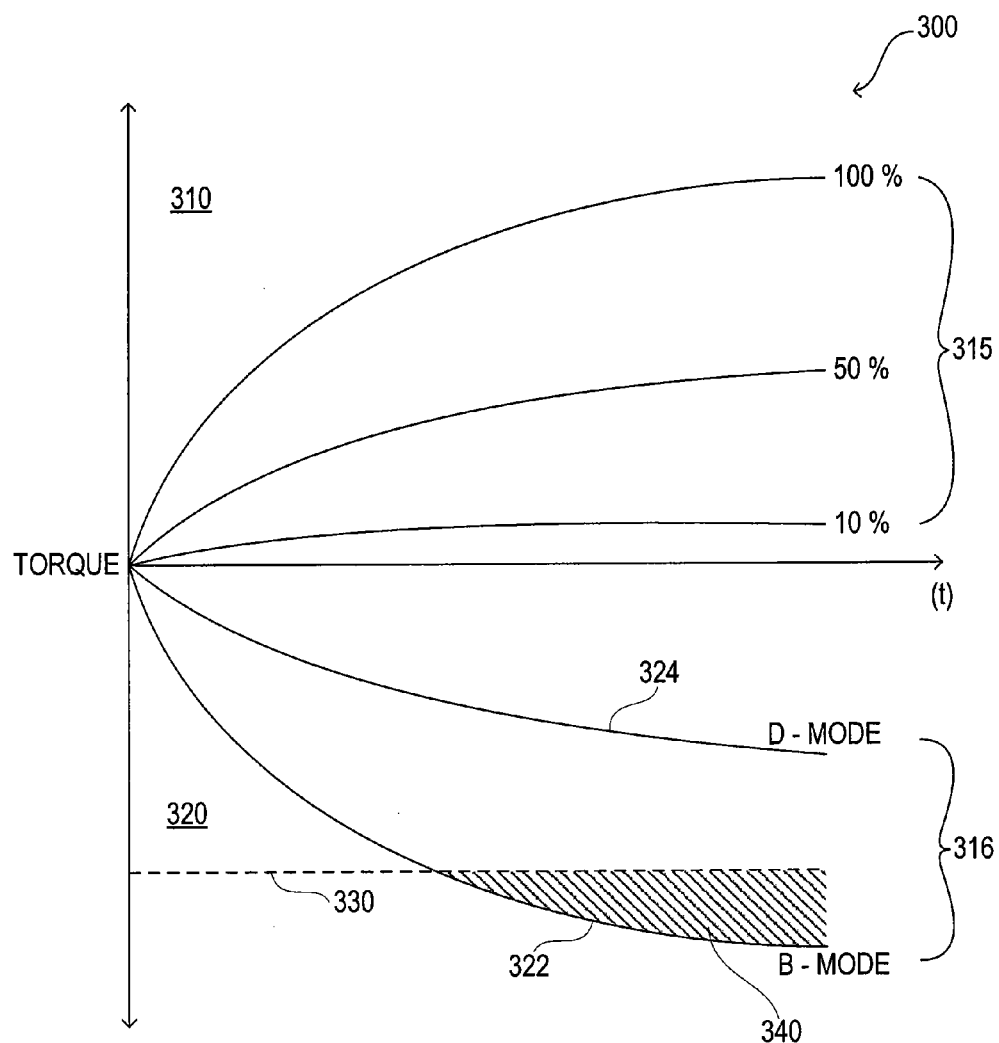
FIG. 3 is a graph showing operational characteristics of an adjustable regenerative limit and warning system for a vehicle according to an embodiment of the present invention.

FIG. 3 shows a graph indicating operational features of an adjustable regenerative limit and warning system 300 for a vehicle. The adjustable regenerative limit and warning system 300 may have certain structural or functional features that are the same as or similar to the systems of FIGS. 1-2. The graph indicates various torque curves for the vehicle versus time, with a positive torque area 310 and a negative torque area 320. The positive torque area 310 corresponds to times when the vehicle is accelerating (i.e., gaining in vehicle speed) while the negative torque area corresponds to times when the vehicle is decelerating (i.e., slowing in vehicle speed). Three positive torque curves 315 indicating vehicle acceleration at 100% of vehicle capability, 50% of vehicle capability, and 10% of vehicle capability are displayed in the positive torque area 310. Energy regeneration for charging a battery of the vehicle occurs in the negative torque area 320 so discussion will now focus on the bottom two negative torque curves 316 in the negative torque area 320.

Torque curve 324 corresponds to a first driving mode (e.g., a D-mode or drive mode) for the vehicle and torque curve 322 corresponds to a second driving mode (e.g., a B-mode or brake mode) for the vehicle, the same or similar as previously discussed. Line 330 indicates further limited torque corresponding to a reduced amount of regenerative energy provided to a battery of the vehicle for recharging the battery. This further limitation may be the maximum amount of regenerative energy capable of recharging the battery due to a characteristic of the battery. When the further limited amount of regenerative energy indicated by line 330 is below the energy capability of the current drive mode of the vehicle, a warning signal, message or other notification to a user of the vehicle is generated. For example, as shown, a warning light or other notification may be generated 340 corresponding to operation of the vehicle in the B-mode, but when the regenerative energy has been further limited to an amount of regenerative energy that is lower than the energy capability of the B-mode. If the vehicle was operating in the D-mode, no warning light or other notification would be generated.

Figure 4:
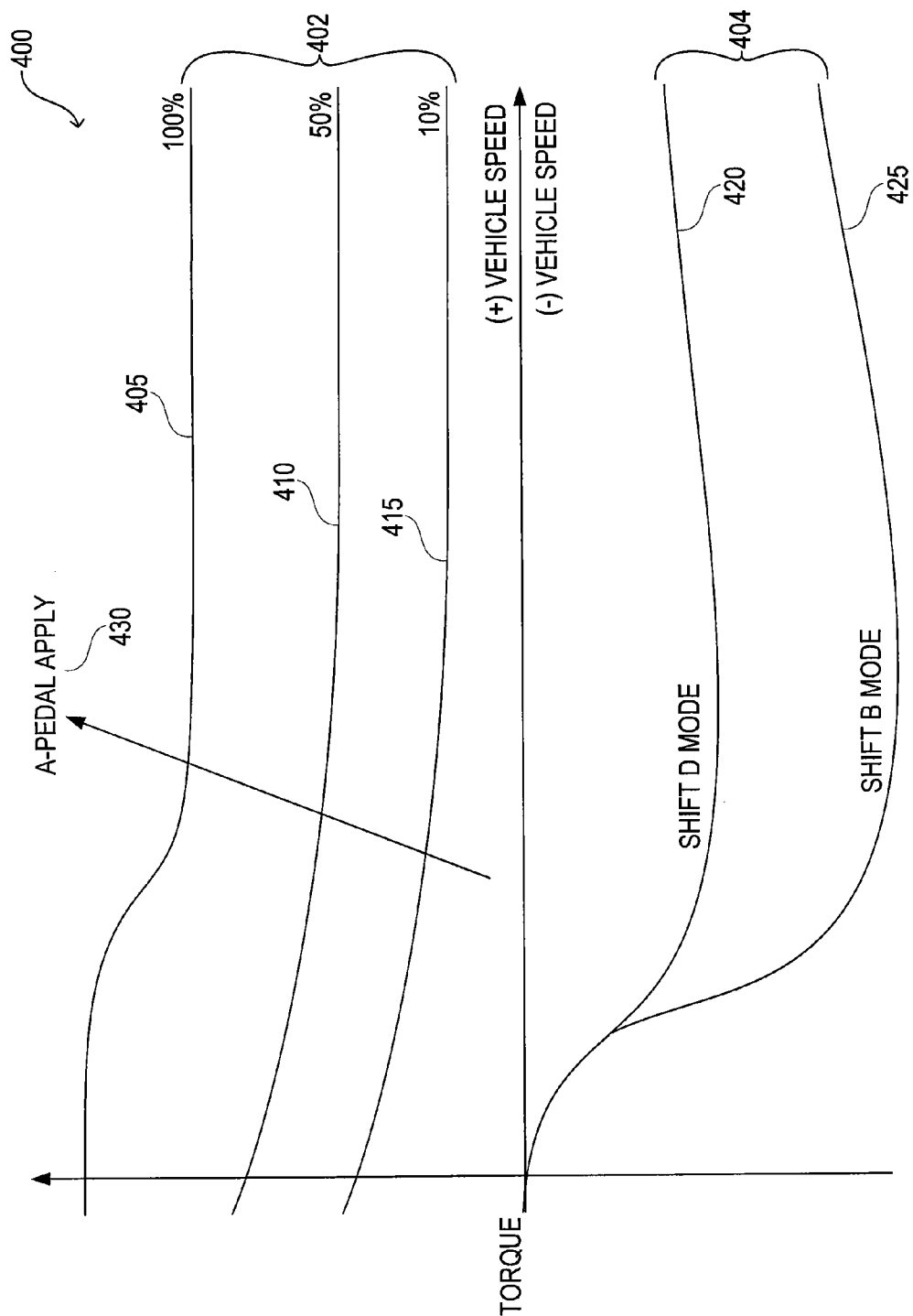
FIG. 4 is a graph showing operational characteristics of an adjustable regenerative limit and warning system for a vehicle according to an embodiment of the present invention.

FIG. 4 shows a graph indicating operational features of an adjustable regenerative limit and warning system 400 for a vehicle. The adjustable regenerative limit and warning system 400 may include certain structural or functional features that are the same as or similar to those previously described for FIGS. 1-3. The graph for the adjustable regenerative limit and warning system 400 includes torque along a y-axis and vehicle speed along an x-axis. Similar to FIG. 3, three positive torque curves 402 are shown within a positive torque area of the graph and two negative torque curves 404 are shown within a negative torque area of the graph. For the positive torque curves 402, upon applying 430 pressure to an accelerator pedal of the vehicle, vehicle speed on the x-axis corresponds to increasing vehicle speed or acceleration in a forward direction while, for the negative torque curves, vehicle speed on the x-axis corresponds to decreasing vehicle speed in the forward direction. A first positive torque curve 405 corresponds to vehicle acceleration at 100% of vehicle capability, a second positive torque curve 410 corresponds to vehicle acceleration at 50% of vehicle capability, and a third positive torque curve 415 corresponds to vehicle acceleration at 10% of vehicle capability. Regenerative energy for charging a battery of the vehicle occurs during decreasing vehicle speed, so discussion will focus on the bottom two torque curves 404.

A first negative torque curve 420 corresponding to a first drive mode (e.g., a Shift D Mode or drive mode) and a second negative torque curve 425 corresponding to a second drive mode (e.g., a Shift B Mode or brake mode) are shown. As seen, when the vehicle is operating in the Shift D Mode due to a command or control from a processor of the vehicle, the level of deceleration of the vehicle is reduced and thus less regenerative energy is provided to a battery of the vehicle. On the contrary, when the vehicle is operating in the Shift B Mode due to a command or control from the processor, the level of deceleration is more aggressive and thus greater regenerative energy is provided to the battery of the vehicle. Therefore, the adjustable regenerative limit and warning system 400 may control or limit the amount of regenerative energy produced or provided by a motor of the vehicle to the battery of the vehicle by selecting an appropriate drive mode for the vehicle when conditions for slowing the vehicle would desirably lend to a slower deceleration rate.

Figure 5:
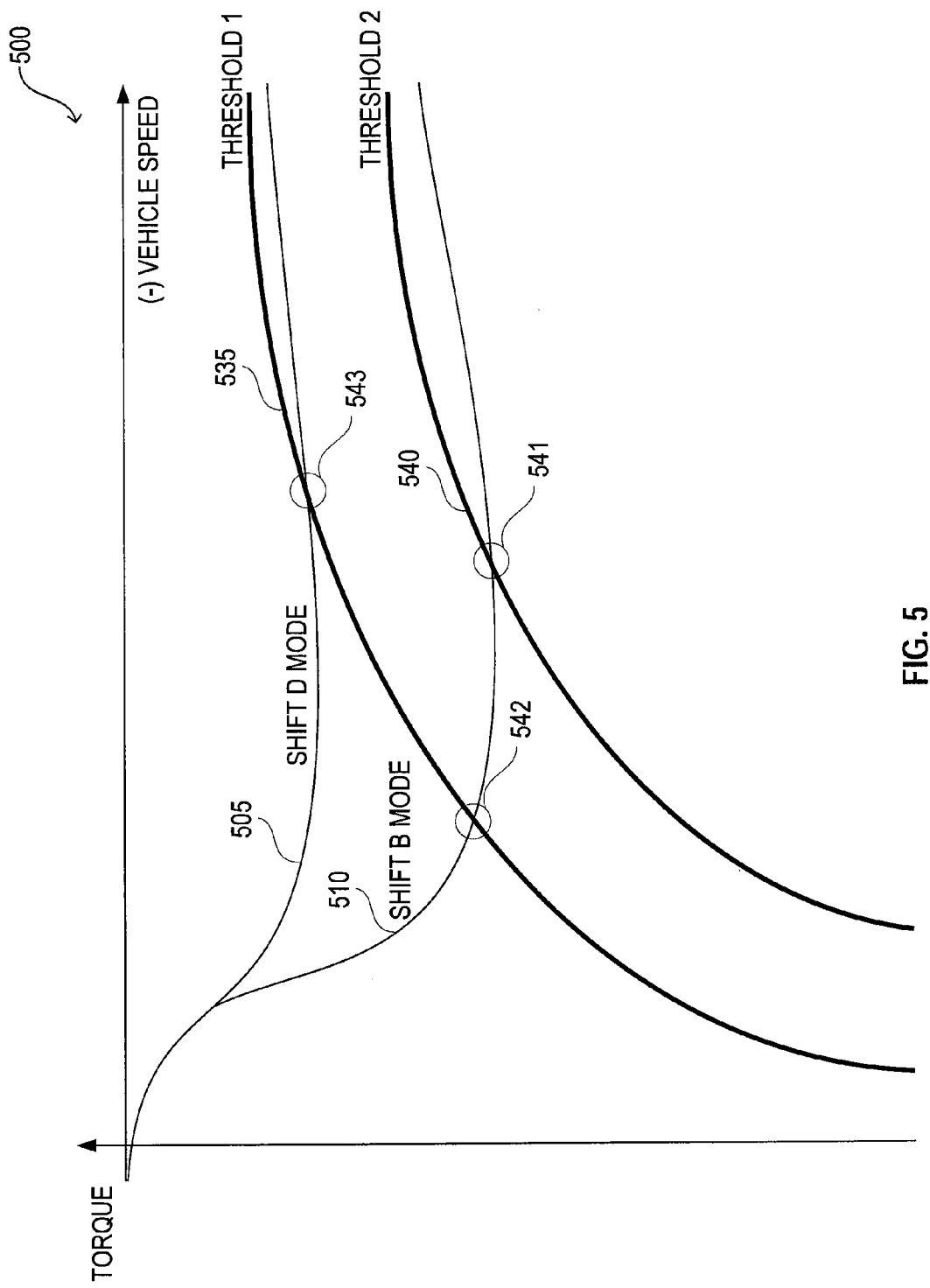
FIG. 5 is a graph showing operational characteristics of an adjustable regenerative limit and warning system for a vehicle according to an embodiment of the present invention.

FIG. 5 shows a graph indicating operational features of an adjustable regenerative limit and warning system 500 for a vehicle. The adjustable regenerative limit and warning system 500 may include certain structural or functional features that are the same as or similar to those previously described for FIGS. 1-4. The graph for the adjustable regenerative limit and warning system 500 includes torque along a y-axis and vehicle speed along an x-axis corresponding to decreasing vehicle speed in a forward direction. A first negative torque curve 505 corresponding to a first drive mode (e.g., Shift D Mode) and a second negative torque curve 510 corresponding to a second drive mode (e.g., Shift B Mode) are shown.

Similar to the discussion above for FIG. 4, the adjustable regenerative limit and warning system 500 may control or limit the amount of regenerative energy produced or provided by a motor of the vehicle to a battery of the vehicle by selecting an appropriate drive mode (e.g., Shift D Mode, Shift B Mode, etc.) having differing torque curves, deceleration rates, regenerative energy capabilities or other characteristics. However, FIG. 5 also indicates a first energy threshold or level 535 (e.g., a curve corresponding to −10 kW power) and a second energy threshold or level 540 (e.g., a curve corresponding to −20 kW power) indicating charge capability energy levels of a battery or other energy storage device of the vehicle. The first energy threshold 535 and the second energy threshold 540 may be used to further limit the regenerative energy of the vehicle based upon the charge capability of the battery. The charge capability may be determined by examining an instantaneous state of charge of the battery (e.g., via determination of an instantaneous current and/or instantaneous voltage of the battery, an instantaneous temperature of the battery, etc.).

The first and/or second energy thresholds or levels (535, 540) may be used for providing a notification or warning message or indication to a user of the vehicle. For example, when the vehicle is operating in Shift B mode, a warning message, buzzer or other indicator will illuminate if the processor of the vehicle limits the regenerative energy provided to the battery to the second energy threshold or level 540 or if the processor limits the regenerative energy provided to the battery to the first energy threshold or level 535 at their respective crossover points (541, 542). However, if the vehicle is instead operating in Shift D Mode, a warning message, buzzer or other indicator will illuminate only due to the first energy threshold or level 535 at its crossover point 543 and not due to the second energy threshold or level 540 because Shift D Mode is not further limited by the second energy threshold or level 540.

Thus, the adjustable regenerative limit and warning system 500 will only display warning or notification messages indicating a reduction in regenerative energy based on battery charge capability if the current drive mode for the vehicle would normally support regenerative energy production greater than the reduced or limited amount. The reduction in various energy thresholds or levels may be calculated by a processor of the vehicle using an algorithm stored in a memory of the vehicle, the algorithm configured to have one or more input variables (e.g., the current drive mode of the vehicle) for adjustably calculating the threshold depending upon the current drive mode. In this way, the adjustable regenerative limit and warning system 500 may prevent or avoid sending nuisance messages or alerts to the user of the vehicle by using adjustable energy thresholds or levels based on instantaneous regenerative energy production and depending on battery charge capability. In an alternative embodiment, any number of algorithms, data tables or other equations or data lookup may be stored in the memory for use by the processor in determining any number of energy thresholds or levels. Similarly, any number of input variables may be utilized by the algorithms, data tables or other equations or lookup data for adjustably calculating or otherwise determining a desired energy threshold or level.

Figure 6A:
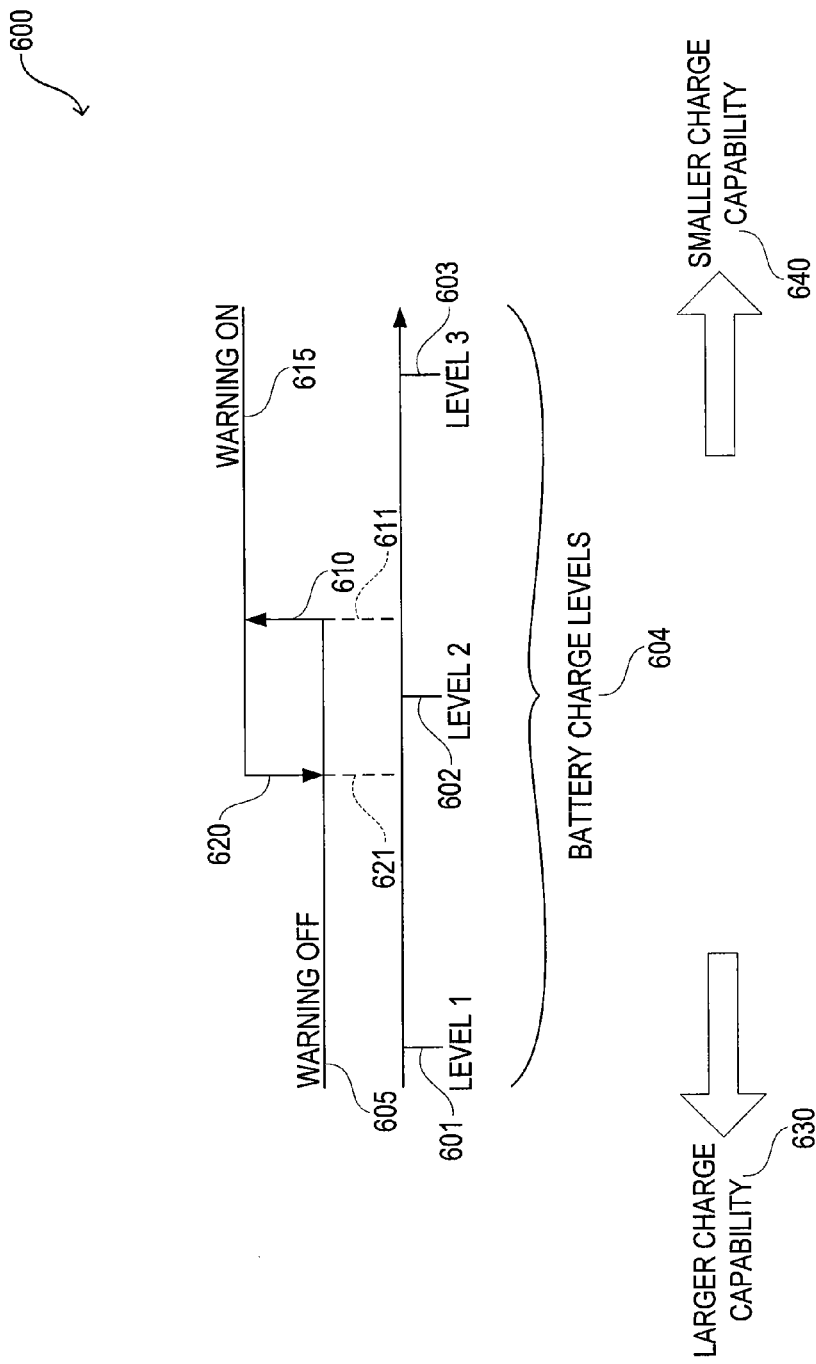
FIG. 6A is a graph showing operational characteristics of an adjustable regenerative limit and warning system for a vehicle according to an embodiment of the present invention.

FIG. 6A shows a depiction 600 indicating operational features of an adjustable regenerative limit and warning system for a vehicle having a battery. The adjustable regenerative limit and warning system may include certain structural or functional features that are the same as or similar to those previously described for FIGS. 1-5. A variety of battery charge levels 604 are shown, including a first charge level 601 (e.g., −30 kW), a second charge level 602 (e.g., −20 kW) and a third charge level 603 (e.g., −10 kW). The battery of the vehicle thus has a larger charge capability 630 at charge levels near the first charge level 601 and decreases towards a smaller charge capability 640 at charge levels near the third charge level 603.

The same or similar as previously discussed, in order to notify a user of the vehicle that a reduced or limited amount of regenerative energy is being generated or transmitted for recharging the battery, a warning message or buzzer may be controlled by a processor of the vehicle, the same or similar as previously discussed. For example, as the charge capability of the battery decreases (e.g., as the battery charges), the warning message is be commanded to turn ON 610 at a first predetermined battery charge level 611, indicating the regenerative energy provided to the battery is being reduced or limited to an amount lower than may normally be obtained. Similarly, as the charge capability of the battery increases (e.g., as the battery discharges), the warning message may be commanded to turn OFF 620 at a second predetermined battery charge level 621, indicating the regenerative energy provided to the battery is no longer being reduced or limited to an amount lower than may normally be obtained. In an alternative embodiment, the warning message may be commanded to turn ON or OFF at a same predetermined battery charge level.

Figure 6B:
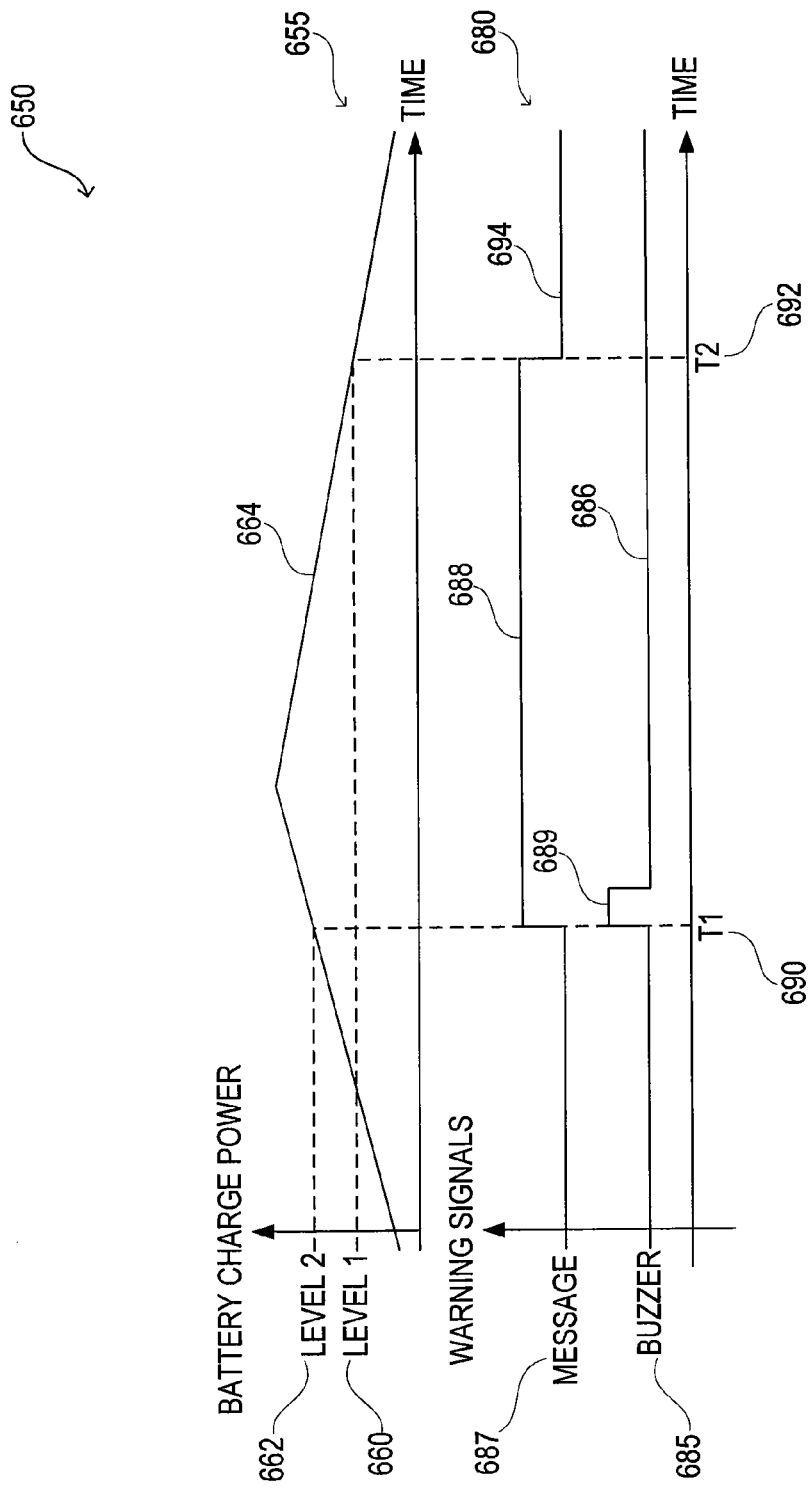
FIG. 6B is a graph showing operational characteristics of an adjustable regenerative limit and warning system for a vehicle according to an embodiment of the present invention.

FIG. 6B similarly shows a depiction 650 indicating operational features of an adjustable regenerative limit and warning system for a vehicle having a battery. The adjustable regenerative limit and warning system may include certain structural or functional features that are the same as or similar to those previously described for FIGS. 1-6A. A first illustration 655 shows battery charge power versus time and a second illustration 680 shows warning signal operation versus time. As shown, the adjustable regenerative limit and warning system has a first battery charge level 660 (e.g., −25 kW) and a second battery charge level 662 (e.g., −20 kW). A battery charge capability decreases when the battery charge energy 664 is charging or increasing (i.e., corresponds to an upwardly inclined slope with respect to time) and increases when the battery charge energy 664 is discharging or decreasing (i.e., corresponds to a downwardly inclined slope with respect to time).

Once the battery charge energy 664 crosses the second battery charge level 662 at a first time 690 during decreasing charge capability and the regenerative energy for provision to the battery is limited, a first warning signal 687 corresponding to a message or other visual indicator is turned ON 688 by the processor. Also at the first time 690, a second warning signal 685 corresponding to a buzzer or other audible indicator is turned ON 689 by the processor. Once the battery charge energy 664 crosses the first battery charge level 660 at a second time 692 during increasing charge capability and the regenerative energy for provision to the battery is no longer limited, the first warning signal 687 corresponding to the message is turned OFF 694 by the processor. The second warning signal 685 corresponding to the buzzer may be turned OFF 686 after a predetermined amount of time after the first time 690 and prior to the second time 692. The predetermined amount of time may be short in duration such that a user is appropriately notified of the reduced battery charge capability but does not become annoyed or frustrated with the buzzer. In an alternative embodiment, the second warning signal 685 may turn off simultaneously with the first warning signal 687. Certain embodiments may use greater or fewer battery charge levels and/or warning signals and utilize alternative timing schemes for activation of the warning signals in response to the battery charge levels.

Figure 7:
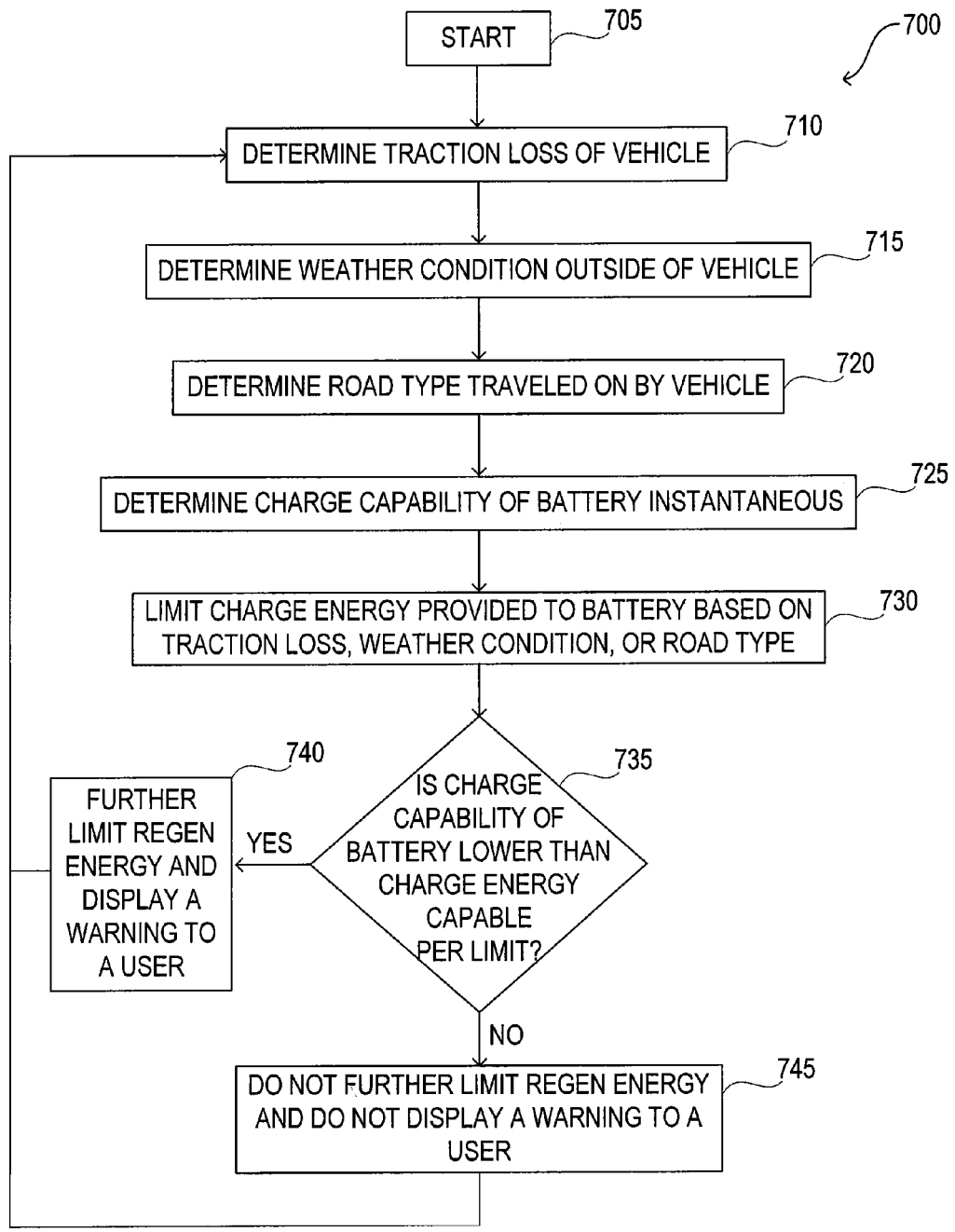
FIG. 7 is a flowchart of an adjustable regenerative limit and warning system for a vehicle according to an embodiment of the present invention.

FIG. 7 shows a flowchart of an adjustable regenerative limit and warning system 700 for a vehicle. The adjustable regenerative limit and warning system 700 may include certain structural or functional features that are the same as or similar to those previously described for FIGS. 1-6B. At step 705, the process starts, for example when a transmission of the vehicle has been placed into a forward moving gear. At step 710, a processor of the vehicle determines whether the vehicle is suffering from or may suffer from traction loss, for example at one or more of the wheels of the vehicle engaged in frictional contact with a road surface. This may be performed by interfacing with other systems or components of the vehicle, such as a traction control system, drivetrain system or differential component. In an alternative embodiment, one or more sensors may be used, such as a speed sensor connected with the processor for determining a speed of the vehicle, to aid in determining whether traction loss will result due to a predetermined amount of braking or deceleration during regenerative energy recapture.

At step 715, the processor of the vehicle determines a weather condition for an environment outside of the vehicle. This may be accomplished via one or more sensors connected with the processor, such as a wetness or moisture sensor for detecting rain or other moisture on or near the vehicle, a temperature sensor, etc. At step 720, the processor of the vehicle determines a road type being traveled on by the vehicle. This may be accomplished by interfacing with other systems or equipment of the vehicle, such as a global positioning system or other navigation equipment capable of identifying a geographic position of the vehicle and associating such geographic position with a particular type of roadway or road surface at such geographic position. At step 725, the processor of the vehicle determines an instantaneous charge capability of a battery of the vehicle. This may be accomplished by one or more sensors (e.g., a temperature sensor, a voltage sensor, a current sensor, etc.) coupled with the battery and interfacing with the processor.

At step 730, the processor limits the charge energy provided to the battery based on any of the traction loss determined in step 710, the weather condition determined in step 715 and/or the road type traveled upon determined in step 720. For example, this limit may be accomplished by selecting a suitable or desired drive mode for the vehicle to operate under for regenerative braking of the vehicle. If conditions are ideal (e.g., no traction loss, the weather is sunny and dry and the vehicle is on a paved roadway), a drive mode may be selected that allows for a maximum amount of regenerative energy to be provided to the battery of the vehicle. If conditions are not ideal (e.g., traction loss is occurring or is calculated to occur at maximum regenerative energy, it is raining or the vehicle is on a gravel roadway), a drive mode may be selected that allows for a reduced amount of regenerative energy to be provided to the battery in order to limit the rate of deceleration of the vehicle.

At step 735, the processor determines if the instantaneous charge capability of the battery determined in step 725 is lower than the amount of regenerative energy allowed to be provided to the battery per the limit of the charge energy in step 730. For example, if conditions are ideal and a drive mode is selected in step 730 that allows for maximum regenerative energy, but the battery has a temperature greater than a predetermined temperature and/or has a charge level higher than a predetermined level, the battery may not capable of accepting the maximum amount of the regenerative energy. If the instantaneous charge capability of the battery is lower than the amount of regenerative energy allowed to be provided, operation continues to step 740. However, if the instantaneous charge capability of the battery is not lower than the amount of regenerative energy allowed to be provided, operation continues to step 745.

At step 740, the amount of regenerative energy provided to the battery per step 730 is further limited based upon the instantaneous charge capability of the battery and a warning message of indicator is displayed or sounded to a user of the vehicle. At step 745, since the battery has a charge capability that can accept the amount of charge energy provided to the battery per step 730, the amount of regenerative energy is not further limited. For both steps 740 and 745, operation then continues back to step 710 so certain steps of the process may be repeated again.

An alternative embodiment of a regenerative limit and warning system may utilize alternative process steps in addition to or in replacement of the process steps specifically outlined in the above embodiments (e.g., FIG. 7). An alternative embodiment may utilize greater or fewer process steps or with alternative ordering or flow than as previously discussed. For example, alternative determinations by the processor that would be suitable for a reduced rate of deceleration may be utilized in addition to or in replacement of certain process steps previously discussed. Moreover, an alternative embodiment may have varying operational functionality and/or utilize additional, alternative or fewer devices or systems for selecting or determining traction loss, weather conditions, road types and/or battery charge capability of or for a vehicle for controlling regenerative energy.

The various features or logic for an adjustable regenerative limit and warning system described in connection with the examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A charging system for a vehicle comprising:
   a battery;
   a motor coupled with the battery and configured to provide energy to the battery for charging the battery;
   a first sensor for sensing wheel slip of the vehicle;
   a memory for storing:
      a first plurality of deceleration torque values corresponding to a first driving mode for regenerating energy for storage in the battery at a first energy regeneration rate, and
      a second plurality of deceleration torque values corresponding to a second driving mode for regenerating energy for storage in the battery at a second energy regeneration rate that is less than the first energy regeneration rate; and
   a processor coupled with the first sensor and the motor, the processor configured to:
      change a current driving mode from the first driving mode to the second driving mode when the wheel slip sensed by the first sensor indicates a traction loss, in order to limit the energy provided by the motor to the battery,
      limit the energy provided by the motor to the battery based on the second plurality of deceleration torque values,
      determine a current charging capability of the battery, and
      further limit the energy provided by the motor to the battery in the second driving mode based on the current charging capability of the battery.

2. The charging system of claim 1 further comprising an indicator electrically connected with the processor and wherein the processor is configured to control the indicator to notify a user of the vehicle when the energy provided by the motor to the battery has been limited.

3. The charging system of claim 2 wherein the indicator is chosen from the group consisting of a light emitting diode, a lamp, and a speaker.

4. The charging system of claim 2 wherein the processor is configured to control the indicator to notify a user of the vehicle when a charge capability of the battery is lower than a threshold value.

5. The charging system of claim 4 further comprising a second sensor electrically connected with the processor for sensing a temperature of the battery and wherein the threshold value is based on the temperature of the battery sensed by the second sensor.

6. The charging system of claim 1 further comprising a second sensor electrically connected with the processor for sensing a weather condition outside of the vehicle and wherein the processor is configured to limit the energy provided by the motor to the battery based upon the weather condition sensed by the second sensor.

7. The charging system of claim 6 wherein the second sensor is configured to sense moisture on an exterior surface of the vehicle.

8. The charging system of claim 1 further comprising a user interface element electrically connected with the processor for controlling a windshield wiper and wherein the processor is configured to limit the energy provided by the motor to the battery based upon manipulation of the user interface element.

9. The charging system of claim 1 further comprising a global positioning device electrically connected with the processor for determining a geographic position of the vehicle and wherein the processor is configured to limit the energy provided by the motor to the battery based upon a type of road surface the vehicle the vehicle is currently traveling on using the geographic position of the vehicle.

10. A charging system for a vehicle comprising:
    a rechargeable battery;
    a motor connected to the rechargeable battery and configured to provide energy to the rechargeable battery for charging the rechargeable battery when the vehicle reduces speed;
    a first sensor for sensing wheel slip of the vehicle;
    a memory for storing:
       a first plurality of deceleration torque values corresponding to a first driving mode for regenerating energy for storage in the rechargeable battery at a first energy regeneration rate, and
       a second plurality of deceleration torque values corresponding to a second driving mode for regenerating energy for storage in the rechargeable battery at a second energy regeneration rate that is less than the first energy regeneration rate;
    a processor connected to the memory and the motor, the processor configured to:
       change a current driving mode from the first driving mode to the second driving mode when the wheel slip sensed by the first sensor indicates a traction loss, in order to limit the energy provided by the motor to the rechargeable battery,
       determine a current charging capability of the rechargeable battery, and
       further limit the energy provided by the motor to the rechargeable battery based on the charging capability of the rechargeable battery; and
    a display connected to the processor and configured to display an indicator in response to a signal from the processor when the energy provided by the motor to the rechargeable battery is further limited based on the charge capability of the rechargeable battery.

11. The charging system of claim 10 further comprising a speed sensor connected with the processor for sensing an instantaneous speed of the vehicle and wherein the processor is configured to limit the energy provided by the motor to the rechargeable battery based on the instantaneous speed of the vehicle.

12. The charging system of claim 11 further comprising:

a temperature sensor connected to the processor for sensing an instantaneous temperature of the rechargeable battery;

a voltage sensor connected to the processor for sensing an instantaneous voltage of the rechargeable battery; and a current sensor connected to the processor for sensing an instantaneous current of the rechargeable battery, wherein the processor is configured to determine the charging capability of the rechargeable battery using the instantaneous temperature of the rechargeable battery, the instantaneous voltage of the rechargeable battery or the instantaneous current of the rechargeable battery.

13. The charging system of claim 10 the memory is further configured to store a first threshold and wherein the first threshold is used by the processor for the further limiting of the energy provided by the motor to the rechargeable battery.

14. The charging system of claim 13 wherein the first threshold is a set of data corresponding to an energy level of the rechargeable battery.

15. The charging system of claim 13 wherein the memory is configured to store a second threshold used by the processor for the further limiting of the energy provided by the motor to the rechargeable battery, the first threshold corresponding to a first energy level and the second threshold corresponding to a second energy level lower than the first energy level.

16. A method for limiting energy of a vehicle for charging the vehicle, the method comprising the steps of:

providing a battery and a motor coupled with the battery, the motor configured to provide energy to the battery;

detecting, using a first sensor, wheel slip of the vehicle;

storing, in a memory, a first plurality of deceleration torque values corresponding to a first driving mode for regenerating energy for storage in the battery at a first energy regeneration rate;

storing, in the memory, a second plurality of deceleration torque values corresponding to a second driving mode for regenerating energy for storage in the battery at a second energy regeneration rate that is less than the first energy regeneration rate;

providing a processor coupled with the motor and the memory;

changing, using the processor, a current driving mode from the first driving mode to the second driving mode when the wheel slip detected by the first sensor indicates a traction loss of the vehicle in order to limit the energy provided by the motor to the battery;

determining, using the processor, a current charging capability of the battery; and further limiting, using the processor, the energy provided to the battery from the motor based on the current charging capability of the battery.

17. The method of claim 16 further comprising the steps of:

storing a first energy level in the memory;

determining a first instantaneous charge capability of the battery; and sending a first signal, using the processor, when the first instantaneous charge capability of the battery exceeds the first energy level.

18. The method of claim 17 further comprising the steps of:

storing a second energy level in the memory, the second energy level different from the first energy level;

determining a second instantaneous charge capability of the battery; and ceasing the sending of the first signal when the second instantaneous charge capability of the battery does not exceed the second energy level.

19. The method of claim 18 further comprising the steps of:

sending a second signal, using the processor, when the first instantaneous charge capability of the battery exceeds the first energy level; and ceasing the sending of the second signal after a predetermined time from the sending of the second signal, the ceasing of the sending of the second signal occurring prior to the ceasing of the sending of the first signal.

20. The method of claim 19 wherein the first signal corresponds to a visual notification to a user of the vehicle and the second signal corresponds to an audible notification to the user of the vehicle.

* * * * *